(12) United States Patent
Thomas et al.

(10) Patent No.: US 6,916,750 B2
(45) Date of Patent: Jul. 12, 2005

(54) HIGH PERFORMANCE ELASTIC LAMINATES MADE FROM HIGH MOLECULAR WEIGHT STYRENIC TETRABLOCK COPOLYMER

(75) Inventors: Oomman Painumoottil Thomas, Alpharetta, GA (US); Glen Thomas Mildenhall, Marietta, GA (US); Alexander J. Neeb, Alpharetta, GA (US); Susan Carol Paul, Alpharetta, GA (US); Tamara Lee Mace, Doraville, GA (US); Arthur Edward Garavaglia, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 103 days.

(21) Appl. No.: 10/395,820

(22) Filed: Mar. 24, 2003

(65) Prior Publication Data

US 2004/0197588 A1 Oct. 7, 2004

(51) Int. Cl.$^7$ .............................................. B32B 27/12
(52) U.S. Cl. .................. 442/104; 442/149; 442/392; 442/394; 442/398
(58) Field of Search .............................. 442/149, 392, 442/394, 398, 104; 428/519, 521

(56) References Cited

U.S. PATENT DOCUMENTS

| | | |
|---|---|---|
| 3,299,174 A | 1/1967 | Kuhre et al. |
| 3,338,992 A | 8/1967 | Kinney |
| 3,341,394 A | 9/1967 | Kinney |
| 3,502,763 A | 3/1970 | Hartmann |
| 3,542,615 A | 11/1970 | Dobo et al. |
| 3,595,942 A | 7/1971 | Wald et al. |
| 3,692,618 A | 9/1972 | Dorschner et al. |
| 3,802,817 A | 4/1974 | Matsuki et al. ............... 425/66 |
| 3,849,241 A | 11/1974 | Buntin et al. ............... 161/169 |
| 4,041,103 A | 8/1977 | Davison et al. |
| 4,296,008 A | 10/1981 | St. Clair et al. |
| 4,340,563 A | 7/1982 | Appel et al. ............... 264/518 |
| 4,479,989 A | 10/1984 | Mahal |
| 4,509,821 A | 4/1985 | Stenger |
| 4,552,795 A | 11/1985 | Hansen et al. |
| 4,555,811 A | 12/1985 | Shimalla |
| 4,568,723 A | 2/1986 | Lu |
| 4,579,907 A | 4/1986 | Wildenau |
| 4,613,640 A | 9/1986 | Deisler et al. |
| 4,636,419 A | 1/1987 | Madsen et al. |
| 4,640,859 A | 2/1987 | Hansen et al. |
| 4,652,487 A | 3/1987 | Morman ............... 428/138 |
| 4,655,760 A | 4/1987 | Morman et al. ........ 604/385 A |
| 4,656,081 A | 4/1987 | Ando et al. |
| 4,657,793 A | 4/1987 | Fisher |
| 4,657,802 A | 4/1987 | Morman |
| 4,663,220 A | 5/1987 | Wisneski et al. |
| 4,668,752 A | 5/1987 | Tominari et al. |
| 4,680,213 A | 7/1987 | Fourezon |
| 4,687,477 A | 8/1987 | Suzuki et al. |
| 4,716,183 A | 12/1987 | Gamarra |
| 4,720,415 A | 1/1988 | Vander Wielen et al. ... 428/152 |

(Continued)

OTHER PUBLICATIONS

"An Introduction to Kraton Polymers", (Issue 3), Kraton-.com (Aug. 2003).*
Kraton Material Safety Data Sheet, G series Resins, Kraton.com (May 2004).*
Shell Sells Kraton to Ripplewood, Looksmart (2000).*

*Primary Examiner*—D. Lawrence Tarazano
(74) *Attorney, Agent, or Firm*—Pauley Petersen & Erickson

(57) ABSTRACT

An elastic laminate is provided which has an elastic layer and one or two outer facing layers. The elastic layer is formed from an improved styrene-(ethylene-butylene)-styrene-(ethylene-butylene) tetrablock copolymer, or a blend of the copolymer. The copolymer has a number average molecular weight of at least about 70,000. The two ethylene-butylene blocks have number average molecular weights which together constitute more than 75% of the number average molecular weight of the copolymer.

56 Claims, 3 Drawing Sheets

U.S. PATENT DOCUMENTS

| | | | | |
|---|---|---|---|---|
| 4,725,468 | A | 2/1988 | McIntyre | |
| 4,756,942 | A | 7/1988 | Aichele | |
| 4,761,198 | A | 8/1988 | Salerno | |
| 4,781,966 | A | 11/1988 | Taylor | 428/152 |
| 4,789,699 | A | 12/1988 | Kieffer et al. | |
| 4,798,853 | A | 1/1989 | Handlin, Jr. | |
| 4,804,577 | A | 2/1989 | Hazelton et al. | |
| 4,835,218 | A | 5/1989 | Yoshimura et al. | |
| 4,842,666 | A | 6/1989 | Werenicz | |
| 4,866,128 | A | 9/1989 | Gergen et al. | |
| 4,880,420 | A | 11/1989 | Pomparelli | |
| 4,900,619 | A | 2/1990 | Ostrowski et al. | |
| 4,904,728 | A | 2/1990 | George | |
| 4,904,731 | A | 2/1990 | Holden et al. | |
| 4,906,507 | A | 3/1990 | Grynaeus et al. | |
| 4,908,247 | A | 3/1990 | Baird et al. | |
| 4,910,064 | A | 3/1990 | Sabee | |
| 4,929,492 | A | 5/1990 | Carey, Jr. et al. | |
| 4,965,122 | A | 10/1990 | Morman | 428/225 |
| 4,968,313 | A | 11/1990 | Sabee | |
| 4,968,754 | A | 11/1990 | Wong | |
| 4,970,259 | A | 11/1990 | Mitchell et al. | |
| 4,977,011 | A | 12/1990 | Smith | |
| 4,977,014 | A | 12/1990 | Mitchell et al. | |
| 4,978,719 | A | 12/1990 | Wong | |
| 4,978,721 | A | 12/1990 | Wong | |
| 4,981,747 | A | 1/1991 | Morman | 428/198 |
| 4,984,584 | A | 1/1991 | Hansen et al. | |
| 4,988,770 | A | 1/1991 | Wong | |
| 4,995,928 | A | 2/1991 | Sabee | |
| 5,002,815 | A | 3/1991 | Yamanaka et al. | |
| 5,011,719 | A | 4/1991 | Gehrke et al. | |
| 5,015,695 | A | 5/1991 | Wong | |
| 5,026,798 | A | 6/1991 | Canich | |
| 5,068,138 | A | 11/1991 | Mitchell et al. | |
| 5,073,436 | A | 12/1991 | Antonacci et al. | |
| 5,085,655 | A | 2/1992 | Mann et al. | |
| 5,091,471 | A | 2/1992 | Graves et al. | |
| 5,093,422 | A | 3/1992 | Himes | |
| 5,139,831 | A | 8/1992 | Mueller | |
| 5,143,968 | A | 9/1992 | Diehl et al. | |
| 5,175,210 | A | 12/1992 | Machado | |
| 5,186,779 | A | 2/1993 | Tubbs | |
| 5,198,281 | A | 3/1993 | Muzzy et al. | |
| 5,200,246 | A | 4/1993 | Sabee | |
| 5,206,300 | A | 4/1993 | Chamberlain | |
| 5,209,801 | A | 5/1993 | Smith | |
| 5,210,147 | A | 5/1993 | Southwick et al. | |
| 5,219,633 | A | 6/1993 | Sabee | |
| 5,226,992 | A | 7/1993 | Morman | 156/62.4 |
| 5,229,191 | A | 7/1993 | Austin | |
| 5,230,701 | A | 7/1993 | Meyer et al. | |
| 5,232,777 | A | 8/1993 | Sipinen et al. | |
| 5,236,770 | A | 8/1993 | Assent et al. | |
| 5,238,733 | A | 8/1993 | Joseph et al. | |
| 5,259,902 | A | 11/1993 | Muckenfuhs | |
| 5,260,126 | A | 11/1993 | Collier, IV et al. | |
| 5,266,394 | A | 11/1993 | Diehl et al. | |
| 5,272,236 | A | 12/1993 | Lai et al. | |
| 5,278,220 | A | 1/1994 | Vermeire et al. | |
| 5,278,272 | A | 1/1994 | Lai et al. | |
| 5,292,795 | A | 3/1994 | Southwick et al. | |
| 5,304,599 | A | 4/1994 | Himes | |
| 5,312,500 | A | 5/1994 | Kurihara et al. | |
| 5,320,899 | A | 6/1994 | Djiauw | |
| 5,332,613 | A | 7/1994 | Taylor et al. | |
| 5,334,437 | A | 8/1994 | Zafiroglu | |
| 5,334,446 | A | 8/1994 | Quantrille et al. | |
| 5,336,545 | A | 8/1994 | Morman | 428/152 |
| 5,336,708 | A | 8/1994 | Chen | |
| 5,340,840 | A | 8/1994 | Park et al. | |
| 5,342,469 | A | 8/1994 | Bodford et al. | |
| 5,344,691 | A | 9/1994 | Hanschen et al. | |
| 5,360,854 | A | 11/1994 | Bozich, Jr. | |
| 5,366,793 | A | 11/1994 | Fitts, Jr. et al. | 428/198 |
| 5,369,174 | A | 11/1994 | Hasselbring | |
| 5,385,775 | A | 1/1995 | Wright | 428/284 |
| 5,391,607 | A | 2/1995 | Fujii et al. | |
| 5,393,599 | A | 2/1995 | Quantrille et al. | |
| 5,393,841 | A | 2/1995 | Himes et al. | |
| 5,413,849 | A | 5/1995 | Austin et al. | |
| 5,415,925 | A | 5/1995 | Austin et al. | |
| 5,422,172 | A | 6/1995 | Wu | |
| 5,431,644 | A | 7/1995 | Sipinen et al. | |
| 5,431,991 | A | 7/1995 | Quantrille et al. | |
| 5,447,462 | A | 9/1995 | Smith et al. | |
| 5,461,111 | A | * 10/1995 | Modic et al. | 525/71 |
| 5,468,428 | A | 11/1995 | Hanschen et al. | |
| 5,470,639 | A | 11/1995 | Gessner et al. | |
| 5,472,775 | A | 12/1995 | Obijeski et al. | |
| 5,476,563 | A | 12/1995 | Nakata | |
| 5,484,645 | A | 1/1996 | Lickfield et al. | |
| 5,486,574 | A | 1/1996 | Himes et al. | |
| 5,501,679 | A | 3/1996 | Krueger et al. | |
| 5,514,470 | A | 5/1996 | Haffner et al. | 428/246 |
| 5,523,146 | A | 6/1996 | Bodford et al. | |
| 5,534,330 | A | 7/1996 | Groshens | |
| 5,548,013 | A | 8/1996 | Fujii et al. | |
| 5,549,964 | A | 8/1996 | Shohji et al. | |
| 5,567,760 | A | 10/1996 | Walther et al. | |
| 5,576,090 | A | 11/1996 | Suzuki | |
| 5,582,668 | A | 12/1996 | Kling | |
| 5,585,411 | A | 12/1996 | Hwo | |
| 5,589,542 | A | * 12/1996 | Himes | 525/98 |
| 5,591,792 | A | 1/1997 | Hattori et al. | |
| 5,592,690 | A | 1/1997 | Wu | |
| 5,597,430 | A | 1/1997 | Rasche | |
| 5,610,238 | A | 3/1997 | Himes et al. | |
| 5,626,571 | A | 5/1997 | Young et al. | |
| 5,627,235 | A | * 5/1997 | Himes | 525/98 |
| 5,628,856 | A | 5/1997 | Dobrin et al. | |
| 5,633,286 | A | 5/1997 | Chen | |
| 5,639,831 | A | 6/1997 | Himes et al. | |
| 5,645,672 | A | 7/1997 | Dobrin | |
| 5,652,041 | A | 7/1997 | Buerger et al. | |
| 5,660,664 | A | 8/1997 | Herrmann | |
| 5,681,302 | A | 10/1997 | Melbye et al. | |
| 5,683,787 | A | 11/1997 | Boich et al. | |
| 5,691,034 | A | 11/1997 | Krueger et al. | |
| 5,695,840 | A | 12/1997 | Mueller | |
| 5,709,921 | A | 1/1998 | Shawver | |
| 5,714,257 | A | 2/1998 | Shah et al. | |
| 5,719,219 | A | 2/1998 | Shah et al. | |
| 5,719,226 | A | 2/1998 | Kegley | |
| 5,733,635 | A | 3/1998 | Terakawa et al. | |
| 5,733,822 | A | 3/1998 | Gessner et al. | |
| 5,736,219 | A | 4/1998 | Suehr et al. | |
| 5,741,857 | A | 4/1998 | Esneault et al. | |
| 5,756,580 | A | 5/1998 | Natori et al. | |
| 5,760,105 | A | 6/1998 | Okada et al. | |
| 5,766,737 | A | 6/1998 | Willey et al. | |
| 5,769,993 | A | 6/1998 | Baldauf | |
| 5,773,373 | A | 6/1998 | Wynne et al. | |
| 5,773,374 | A | 6/1998 | Wood et al. | |
| 5,777,028 | A | 7/1998 | Okada et al. | |
| 5,777,031 | A | 7/1998 | Djiauw et al. | |
| 5,777,043 | A | 7/1998 | Shafer et al. | |
| 5,789,046 | A | 8/1998 | Mueller | |
| 5,789,065 | A | 8/1998 | Haffner et al. | 428/152 |
| 5,789,328 | A | 8/1998 | Kurihara et al. | |
| 5,804,286 | A | 9/1998 | Quantrille et al. | |

| | | | | | | |
|---|---|---|---|---|---|---|
| 5,804,512 A | 9/1998 | Lickfield et al. | | 6,093,768 A | 7/2000 | Nakano et al. |
| 5,804,628 A | 9/1998 | Busnel et al. | | 6,096,668 A | 8/2000 | Abuto et al. |
| 5,814,176 A | 9/1998 | Proulx | | 6,103,647 A | 8/2000 | Shultz et al. |
| 5,840,632 A | 11/1998 | Miller | | 6,106,925 A | 8/2000 | Palumbo |
| 5,840,633 A | 11/1998 | Kurihara et al. | | 6,117,176 A | 9/2000 | Chen |
| 5,843,068 A | 12/1998 | Allen et al. | | 6,124,428 A | 9/2000 | Schmieg et al. |
| 5,847,051 A | 12/1998 | Hwo et al. | | 6,127,043 A | 10/2000 | Lange |
| 5,853,881 A | 12/1998 | Estey et al. .................. 428/373 | | 6,148,830 A | 11/2000 | Chen |
| 5,861,074 A | 1/1999 | Wu | | 6,156,842 A | 12/2000 | Hoenig et al. |
| 5,863,978 A | 1/1999 | Vosters | | 6,166,134 A | 12/2000 | Modic et al. |
| 5,883,155 A | 3/1999 | Hoerner et al. | | 6,184,291 B1 | 2/2001 | Ahmed et al. |
| 5,884,639 A | 3/1999 | Chen | | 6,187,425 B1 | 2/2001 | Bell et al. |
| 5,885,686 A | 3/1999 | Cedarblad et al. | | 6,190,768 B1 | 2/2001 | Turley et al. |
| 5,888,607 A | 3/1999 | Seth et al. | | 6,214,147 B1 | 4/2001 | Mortellite et al. |
| 5,891,957 A | 4/1999 | Hansen et al. | | 6,218,470 B1 | 4/2001 | Betso et al. |
| 5,932,648 A | 8/1999 | Troska et al. | | 6,221,483 B1 | 4/2001 | Hilston et al. |
| 5,939,178 A | 8/1999 | Boich | | 6,251,982 B1 | 6/2001 | Masse et al. |
| 5,952,252 A | 9/1999 | Shawver et al. | | 6,258,196 B1 | 7/2001 | Suzuki et al. |
| 5,952,952 A | 9/1999 | Choi et al. .................. 341/172 | | 6,265,045 B1 | 7/2001 | Mushaben |
| 5,973,071 A | 10/1999 | Modic | | 6,277,916 B1 | 8/2001 | Terbrueggen et al. |
| 5,994,450 A | 11/1999 | Pearce | | 6,323,389 B1 | 11/2001 | Thomas et al. |
| 5,997,989 A | 12/1999 | Gessner et al. | | 6,369,161 B1 | 4/2002 | Betso et al. |
| 6,001,460 A | 12/1999 | Morman et al. | | 6,376,095 B1 | 4/2002 | Cheung et al. |
| 6,013,151 A | 1/2000 | Wu et al. | | 6,387,471 B1 | 5/2002 | Taylor et al. |
| 6,013,726 A | 1/2000 | Nakano et al. | | 6,403,710 B1 | 6/2002 | Ahmed et al. |
| 6,025,067 A | 2/2000 | Fay | | 6,410,129 B2 | 6/2002 | Zhang et al. |
| 6,048,808 A | 4/2000 | Kurihara et al. | | 6,420,475 B1 | 7/2002 | Chen |
| 6,060,009 A | 5/2000 | Welygan et al. | | 6,455,627 B1 * | 9/2002 | De Keyzer et al. ......... 524/505 |
| 6,069,097 A | 5/2000 | Suzuki et al. | | 6,458,891 B1 | 10/2002 | Yonezawa et al. |
| RE36,757 E * | 6/2000 | Himes .......................... 525/98 | | 6,475,600 B1 | 11/2002 | Morman et al. |
| 6,074,505 A | 6/2000 | Ouellette et al. | | 2002/0104608 A1 | 8/2002 | Welch et al. ................ 156/176 |
| 6,087,435 A | 7/2000 | Nakano et al. | | 2004/0122409 A1 * | 6/2004 | Thomas et al. ......... 604/385.24 |
| 6,090,234 A | 7/2000 | Barone et al. | | | | |
| 6,093,663 A | 7/2000 | Ouellette et al. | | * cited by examiner | | |

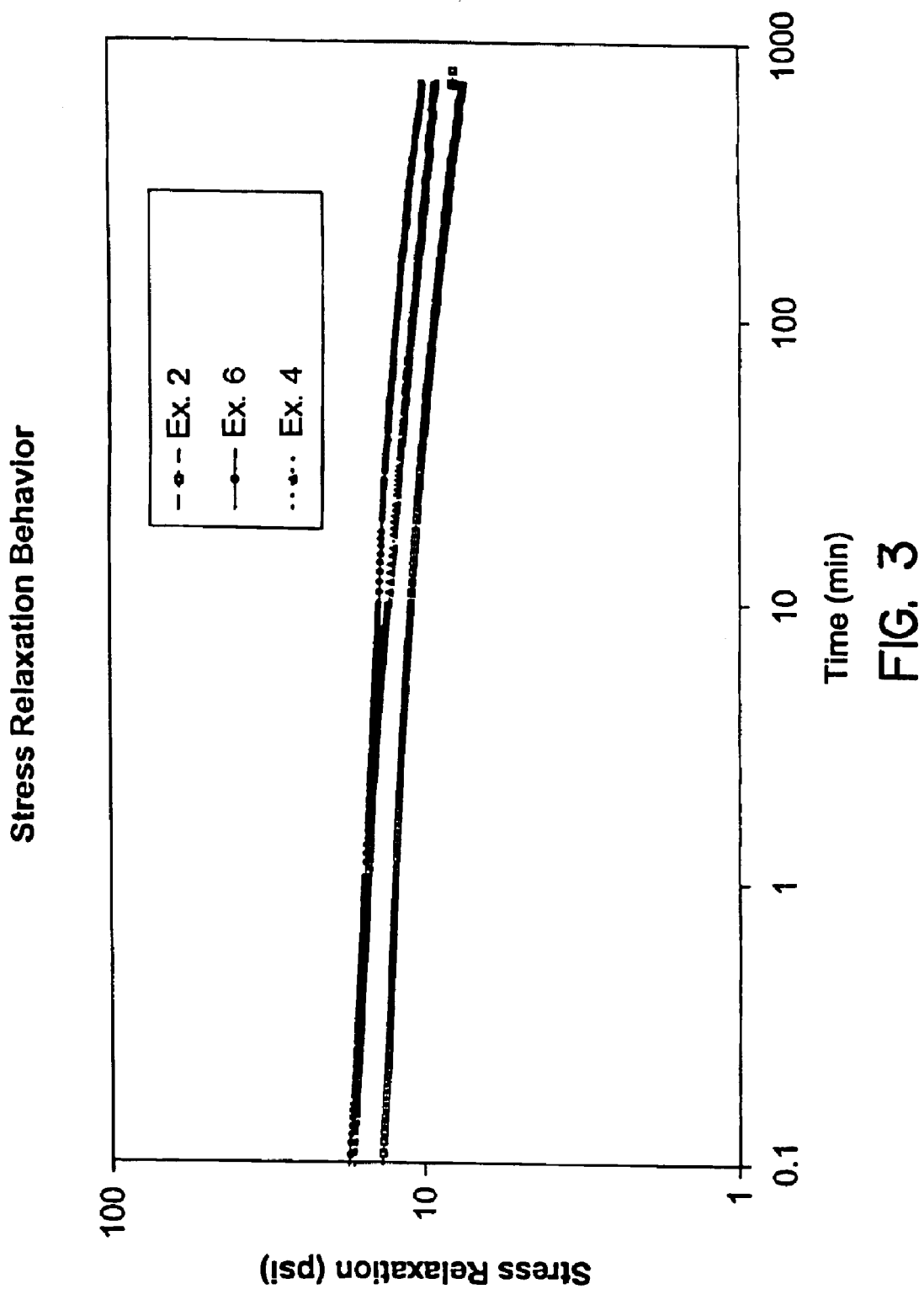

HIGH PERFORMANCE ELASTIC LAMINATES MADE FROM HIGH MOLECULAR WEIGHT STYRENIC TETRABLOCK COPOLYMER

FIELD OF INVENTION

The present invention relates to elastic laminates including an elastic polymer layer selected from a styrene-(ethylene-butylene)-styrene-(ethylene-butylene) tetrablock copolymer, herein referred to as SEBSEB.

BACKGROUND OF THE INVENTION

Various elastic composites have been formed by bonding an elastic polymer layer in the form of a film, foam, nonwoven web or parallel strands, to one or more nonwoven facing layers. A "stretch bonded laminate" ("SBL") is any laminate in which an elastic layer is bonded to one or more facing layers while the elastic layer is stretched. When the elastic layer is subsequently relaxed, gathers form in the facing layer(s). Stretch-bonded laminates are described, for instance, in U.S. Pat. No. 5,952,952 to Shawver et al., U.S. Pat. No. 6,387,471 to Taylor et al., and U.S. Pat. No. 6,323,389 to Thomas et al., which are incorporated herein by reference. A "neck-bonded laminate" ("NBL") is any laminate where an elastic layer is bonded to one or two non-elastic facing layers while the elastic layer is relaxed and the facing layer(s) are extended or necked to reduce their dimensions in the direction orthogonal to the extension. Neck-bonded laminates have cross-directional stretch and recovery properties. Neck-bonded laminates are described, for instance, in U.S. Pat. No. 5,853,881 to Estey et al., U.S. Pat. No. 4,965,122 to Morman, and U.S. Pat. No. 6,001,460 to Morman et al., and U.S. Pat. No. 5,789,065 to Haffner et al., which are incorporated herein by reference. A "neck-stretch bonded laminate" ("NSBL") is any laminate where an elastic layer is bonded to one or two facing layers while the elastic layer is stretched, and the facing layer(s) are extended in the same direction to cause necking in the direction orthogonal to the extension. Thus, a NSBL has features common to both a SBL and a NBL.

Various thermoplastic elastomers are known for use in the elastic layer, including without limitation styrenic block copolymers. For instance, U.S. Pat. No. 6,323,389 to Thomas et al. discloses the use of block copolymers having the general formula A-B-A' or A-B, wherein A and A' are each a thermoplastic polymer end block which contains a styrenic moiety such as a poly(vinylarene) and B is an elastomeric polymer midblock such as a conjugated diene or a lower alkene polymer. The A and A' blocks may be formed of the same or different polymer segments. Tetrablock copolymers having the formula A-B-A-B are also disclosed, where A is a thermoplastic polymer block as described above, and each B is an isoprene segment hydrogenated substantially to a poly(ethylene-propylene) segment.

Elastic laminates are typically the most expensive component in personal care products such as diapers, diaper pants, adult incontinence garments, feminine hygiene products and the like. Important properties of elastic laminates include providing sufficient elastic tension at various degrees of elongation during use, and providing sufficient recovery upon stress relaxation (creep resistance).

There is a need or desire for elastic laminates which achieve these objectives, at reduced expense, for instance by requiring lower amounts of elastic polymer material, and for improved elastic polymers which facilitate these objectives.

SUMMARY OF THE INVENTION

The present invention is directed to an elastic laminate in which an elastic layer is formed from an improved elastic polymer or blend of the polymer. The elastic laminate includes one or two outer facing layers bonded to an elastic layer. The elastic layer includes the following components:

a) about 25–100% by weight of a styrene-(ethylene-butylene)-styrene-(ethylene-butylene) tetrablock copolymer ("SEBSEB copolymer");

b) 0 to about 25% by weight of a poly(monoalkenyl arene);

c) 0 to about 25% by weight of a polyolefin; and d) 0 to about 25% by weight of a tackifying resin.

The SEBSEB copolymer includes two styrene blocks and two ethylene-butylene blocks. The SEBSEB copolymer has a number average molecular weight of at least 70,000. The two ethylene-butylene blocks have number average molecular weights which together may constitute more than 75% of the number average molecular weight of the SEBSEB copolymer.

With the foregoing in mind, it is a feature and advantage of the invention to provide an improved elastic laminate which includes an elastic layer made from the above described composition.

BRIEF DESCRIPTION OF THE DRAWINGS

FIG. 3 illustrates stress relaxation behavior for inventive and comparative vertical filament stretch-bonded laminates.

DEFINITIONS

Figure 1:
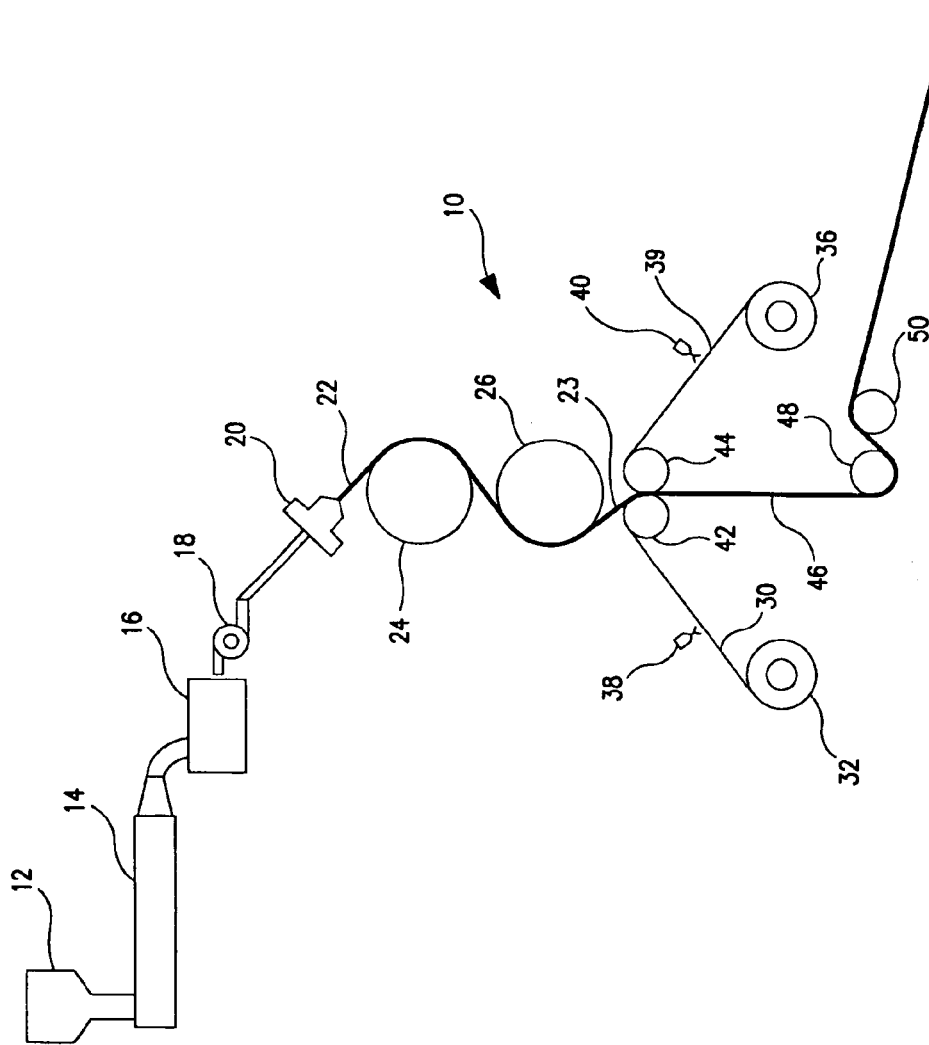
FIG. 1 schematically illustrates a process for making stretch-bonded laminates including a layer of substantially parallel elastic filaments and two outer nonwoven facing layers.

"Block copolymer" is a polymer in which dissimilar polymer segments, each including a string of similar monomer units, are connected by covalent bonds. For instance, a SEBSEB block copolymer includes a string or segment of repeating styrene units, followed by a string or segment of repeating ethylene-butylene units, followed by a second string or segment of repeating styrene units, followed by a second string or segment of repeating ethylene-butylene units.

The term "nonwoven fabric or web" means a web having a structure of individual fibers or threads which are interlaid, but not in an identifiable manner as in a knitted or woven fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

The term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier, which is defined as grams per 9000 meters of a fiber and may be calculated as fiber diameter in microns squared, multiplied by the density of the polymer in grams/cc, multiplied by 0.00707. A lower denier indicates a finer fiber and a higher denier indicates a thicker or heavier fiber. For example, the diameter of a polypropylene fiber given as 15 microns may be converted to denier by squaring, multiplying the result by 0.89 g/cc and multiplying by 0.00707. Thus, a 15 micron polypropylene fiber has a denier of about 1.42 ($15^2 \times 0.89 \times 0.00707 - 1.415$).

The term "spunbonded fibers" refers to small diameter fibers which are formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al. Spunbond fibers are generally not tacky when they are deposited onto a collecting surface. Spunbond fibers are generally continuous and have average diameters (from a sample of at least 10) larger than 7 microns, more particularly, between about 10 and 20 microns.

The term "meltblown fibers" means fibers formed by extruding a molten thermoplastic material through a plurality of fine, usually circular, die capillaries as molten threads or filaments into converging high velocity, usually hot, gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al. Meltblown fibers are microfibers which may be continuous or discontinuous, are generally smaller than 10 microns in average diameter, and are usually tacky when deposited onto a collecting surface.

The term "filament arrays" means substantially parallel rows of filaments which may be such as those disclosed in U.S. Pat. No. 5,385,775 to Wright and U.S. Pat. No. 5,366,793 to Varona et al., and Published U.S. patent application 2002/0104608 to Welch et al.

"Neck bonding" refers to the process wherein an elastic member is bonded to a non-elastic member while only the non-elastic member is extended or necked so as to reduce its dimension in the direction orthogonal to the extension. "Neck bonded laminate" refers to a composite elastic material made according to the neck bonding process, i.e., the layers are joined together when only the non-elastic layer is in an extended condition. Such laminates usually have cross directional stretch properties. Further examples of neck-bonded laminates are such as those described in U.S. Pat. Nos. 5,226,992, 4,981,747, 4,965,122 and 5,336,545 to Morman and U.S. Pat. No. 5,514,470 to Haffner et al.

"Stretch bonding" refers to a process wherein an elastic member is bonded to another member while only the elastic member is extended at least about 25 percent of its relaxed length. "Stretch bonded laminate" refers to a composite elastic material made according to the stretch bonding process, i.e., the layers are joined together when only the elastic layer is in an extended condition so that upon relaxing the layers, the nonelastic layer is gathered. Such laminates usually have machine directional stretch properties and may be subsequently stretched to the extent that the nonelastic material gathered between the bond locations allows the elastic material to elongate. One type of stretch bonded laminate is disclosed, for example, by U.S. Pat. No. 4,720,415 to Vander Wielen et al., in which multiple layers of the same polymer produced from multiple banks of extruders are used. Other composite elastic materials are disclosed in U.S. Pat. No. 4,789,699 to Kieffer et al., U.S. Pat. No. 4,781,966 to Taylor and U.S. Pat. Nos. 4,657,802 and 4,652,487 to Morman and U.S. Pat. No. 4,655,760 to Morman et al., as well as U.S. Pat. No. 5,385,775 to Wright.

"Neck-stretch bonding" generally refers to a process wherein an elastic member is bonded to another member while the elastic member is extended at least about 25 percent of its relaxed length and the other layer is a necked, non-elastic layer. "Neck-stretch bonded laminate" refers to a composite elastic material made according to the neck-stretch bonding process, i.e., the layers are joined together when both layers are in an extended condition and then allowed to relax. Such laminates usually have omni-directional stretch properties.

The terms "elastic" and "elastomeric" when referring to a fiber, film or fabric mean a material which upon application of a biasing force, is stretchable by at least 50% to a stretched, biased length which is at least 50% greater than, its relaxed, unstretched length, and which will recover at least 50 percent of its elongation upon release of the stretching, biasing force.

The term "recover" refers to a relaxation of a stretched material upon removal of a biasing force following stretching of the material by application of the biasing force. For example, if a material having a relaxed, unbiased length of one (1) inch was elongated 50 percent by stretching to a length of one and one half (1.5) inches the material would have a stretched length that is 50% greater than its relaxed length. If this exemplary stretched material contracted, that is recovered to a length of one and one tenth (1.1) inches after release of the biasing and stretching force, the material would have recovered 80 percent (0.4 inch) of its elongation.

The term "un-necking" means a process applied to a reversibly necked material to extend it to at least its original, pre-necked dimensions by the application of a stretching force in a direction generally perpendicular to the direction of the original stretching force which causes it to recover to within at least about 50 percent of its reversibly necked dimensions upon release of the stretching force.

The term "polymer" generally includes but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the molecule. These configurations include, but are not limited to isotactic, syndiotactic and random symmetries.

The term "blend" means a mixture of two or more polymers while the term "alloy" means a sub-class of blends wherein the components are immiscible but have been compounded to form dispersed, discontinuous and/or continuous phases.

The term "similar web or laminate" means a web or laminate which uses essentially the same process conditions as the inventive material but in which the polymers have been changed slightly. According to *Webster's New Collegiate Dictionary* (1980), "similar" means 1) having characteristics in common; strictly comparable, 2) alike in substance or essentials; corresponding. Using this commonly accepted meaning of the word similar, this term means that all other conditions are essentially the same except for the conditions mentioned. It should be noted that not all conditions will be exactly identical between the different polymers since the changes in the composition itself cause process changes, in for example, the optimum temperatures needed.

The term "garment" means any type of non-medically oriented apparel which may be worn. This includes industrial workwear like coveralls, undergarments, pants, shirts, jackets, gloves, socks, and the like.

The term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

The term "personal care product" means diapers, training pants, absorbent underpants, adult incontinence products, and feminine hygiene products.

DETAILED DESCRIPTION OF THE PRESENTLY PREFERRED EMBODIMENTS

In accordance with the invention, an elastic laminate is provided including an elastic layer bonded to one or two facing layers. The elastic layer is formed from a blend or alloy including about 25–100% by weight of a SEBSEB copolymer, zero to about 25% by weight of a poly (monoalkenyl arene), zero to about 25% by weight of a polyolefin, and zero to about 25% by weight of a tackifying resin. The blend or alloy may include, for instance, about 50–80% by weight of the SEBSEB copolymer, about 4–15% by weight of the poly(monoalkenyl arene), about 5–20% by weight of the polyolefin, and zero to about 25% by weight of the tackifying resin. The blend or alloy may include about 65–75% by weight of the SEBSEB copolymer, about 5–10% by weight of the poly(monoalkenyl arene), about 5–15% by weight of the polyolefin, and about 10–25% by weight of the tackifying resin. The blend or alloy may include about 68–75% by weight of the SEBSEB copolymer, about 5–7% by weight of the polystyrene, about 6–8% by weight of the polyolefin, and about 13–20% by weight of the tackifying resin. Depending on the end use application, the elastic layer may be provided in the form of a film, foam, fibrous nonwoven web, net, or an array of substantially parallel and nonintersecting filaments.

The SEBSEB copolymer has a number average molecular weight of at least about 70,000. The SEBSEB copolymer may, for instance, have a number average molecular weight of about 70,000 to about 120,000, suitably about 73,000 to about 100,000. The relatively high molecular weight is desirable from the standpoint of creep resistance. The relatively high molecular weight SEBSEB copolymer provides good increased elastic performance for both the elastic layer and the laminate, while maintaining a low enough viscosity so as not to inhibit processing. The SEBSEB copolymer provides increased elastic tension as a function of elongation, compared to previously disclosed styrene-(ethylene-propylene)-styrene-(ethylene-propylene) tetrablock copolymers of similar molecular weight.

The SEBSEB copolymer may have a linear molecular block structure designed to maximize the molecular entanglement and elastic tension of the elastic layer, thus allowing the use of a lower basis weight elastic layer to achieve the desired tension in end use applications. The molecular structure includes a styrene end block, followed by an ethylene-butylene midblock, followed by a styrene midblock, followed by an ethylene-butylene end block.

To achieve optimal elastic properties, the styrene end block may have a number average molecular weight of about 6,000 to about 8,000. The styrene midblock may have a number average molecular weight of about 7,500 to about 9,000. The number average molecular weight of the styrene midblock can be at least about 5% higher than the number average molecular weight of the styrene end block, suitably about 5–50% higher, suitably about 10–50% higher, suitably about 10–40% higher, suitably about 15–35% higher. The styrene midblock and the styrene end block may be polystyrene blocks.

The ethylene-butylene midblock may have a number average molecular weight of about 55,000 to about 70,000. The ethylene-butylene end block may have a molecular weight of about 5,000 to about 12,000. The number average molecular weight of the ethylene-butylene midblock can be at least about 5 times as high as the number average molecular weight of the ethylene-butylene end block, and is suitably about 5–14 times as high, suitably about 6–12 times as high. The two ethylene-butylene blocks have number average molecular weights which together may constitute more than 75% of the number average molecular weight of the SEBSEB copolymer, suitably about 77–90%, suitably about 78–85%

The SEBSEB copolymer may have an order-disorder transition temperature less than 240° C., a melt flow rate less than 2.0 grams/10 min. measured using a 5 kg load at 200° C. according to ASTM D1238, and a melt flow rate of 4.0–20 grams/10 min. measured using a 5 kg load at 250° C. according to ASTM D1238. The ethylene-butylene blocks are formed by selective hydrogenation of butadiene units in a styrene-butadiene-styrene-butadiene tetrablock copolymer. At least 90% of the olefinically unsaturated double bonds in the butadiene units are hydrogenated. The unhydrogenated butadiene blocks may have a 1,2-vinyl bond content of greater than 25% and less than 60%.

The poly(monoalkenyl arene) useful in the elastic layer may be a styrene polymer selected from crystal polystyrene and anionic polystyrene. The styrene polymer is used to increase the strength and modulus of the elastic layer. High impact polystyrene, which includes dispersed rubber, is generally not useful for these purposes. The crystal polystyrene may have a melt flow rate of about 8–20, suitably about 13–17, measured using ASTM D1238, a temperature of 230° C., and a load of 5 kg. The anionic polystyrene should have a number average molecular weight of about 5,000 to about 100,000, suitably about 5,000 to about 10,000.

Polyolefins useful in the elastic layer include both crystalline and elastomeric polyolefins. The polyolefin is used to increase the modulus of the elastic layer and improve its flow properties, and must be compatible with the SEBSEB copolymer for mixing purposes. Suitable polyolefins include homopolymers and copolymers of ethylene, propylene and butylene, and blends thereof. The polyolefin may be prepared using a Ziegler-Natta or single-site catalyst. Single-site catalyzed polyolefins include those available from Dow Chemical Co. under the trade names AFFINITY or ENGAGE, and from Exxon-Mobil Chemical Co. under the trade name EXACT. Suitable polyolefins include low density polyethylenes and linear low density polyethylenes having densities less than about 0.93 grams/cm$^3$ and high melt indices (190° C., ASTM D1238), suitably greater than about 100 grams/10 min. One suitable polyolefin is PETROTHANE NA601 polyethylene from Quantum Chemical Co., having a density of about 0.903 grams/cm$^3$ and a melt index (190° C., ASTM D1238) of about 2,000 grams/10 min. Other suitable polyolefins include polyethylene homopolymer and copolymer waxes available from Eastman Chemical Co. under the trade name EPOLENE, for instance EPOLENE C-10 polyethylene wax.

Tackifying resins are useful in the elastic layer to improve tack and reduce the viscosity of the blend or alloy. The tackifying resin should be compatible with the SEBSEB and should be able to withstand the processing temperatures. Suitable temperature stable tackifiers include hydrogenated hydrocarbon resins, including ARKON resins available from Arakawa Co., REXTAC resins available from Huntsman Chemical Co., ESCOREZ resins available from Exxon-Mobil Chemical Co., and ESOTAC, REGALITE and REGALREZ resins from Eastman Chemical Co. Particularly suitable resins include low molecular weight hydrogenated polystyrene and poly-alphamethyl styrene hydrocarbon resins, such as REGALREZ 1126 and 1139 from Eastman Chemical Co.

The elastic layer may also include other components of the types and amounts that do not adversely affect its elastic performance. Examples of other components include pigments, antioxidants, stabilizers, surfactants, waxes, flow promoters, particulate fillers, and processing aids. The ingredients of the elastic layer may be combined using roll milling, extrusion mixing, and other suitable mixing techniques.

The elastic layer is joined to one or two outer facing layers by extrusion melt bonding, thermal calender bonding, adhesive bonding, or another suitable process. The outer facing layers suitably include a fibrous nonwoven material, or a laminate including one or more fibrous nonwoven materials. Suitable nonwoven materials include spunbond webs, meltblown webs, bonded carded webs, air laid webs, hydraulically entangled webs, and arrays of substantially parallel and nonintersecting filaments. Laminates of two or more nonwoven materials, for instance a spunbond-meltblown-spunbond web, or laminates including a film and a nonwoven material, may also be employed as the facing layer or layers. When one facing layer is employed, it is joined to one side of the elastic layer. When two facing layers are employed, they are joined to both sides of the elastic layer, with the elastic layer between the facing layers.

The nonwoven facing layers may be formed using inelastic or elastic polymers. Suitable generally inelastic polymers include polyolefins such as homopolymers of ethylene, propylene, and butylene, and copolymers of these monomers including generally up to 10% by weight of an alpha-olefin comonomer having up to about 12 carbon atoms. Inelastic polymers also include certain polyamides, polyesters and the like. Suitable elastic polymers include copolymers of ethylene, propylene and butylene with an alpha-olefin comonomer which generally contains more than 10% but less than 90% by weight of each comonomer. Elastic olefin copolymers include, for instance, single-site catalyzed copolymers of ethylene with more than 10% by weight of an alpha-olefin comonomer, having a density of about 0.855 to 0.900 grams/cm$^3$. Suitable elastic polymers for the nonwoven facing layers also include ethylene vinyl acetate, ethylene ethyl acrylate, ethylene methyl acrylate, ethylene butyl acrylate, polyurethane, block co-poly(ether-ester) and block co-poly(amide-ether).

As indicated above, the elastic layer and the facing layer(s) may be joined together using a variety of processes suitable for a variety of applications. The form of the elastic layer (whether film, foam, nonwoven web, net or filament array), and the form and polymer type used in the facing layer(s) (whether elastic or inelastic) will depend largely on the process and the end use application. Two exemplary processes for forming elastic laminates are illustrated in FIGS. 1 and 2.

Figure 2:
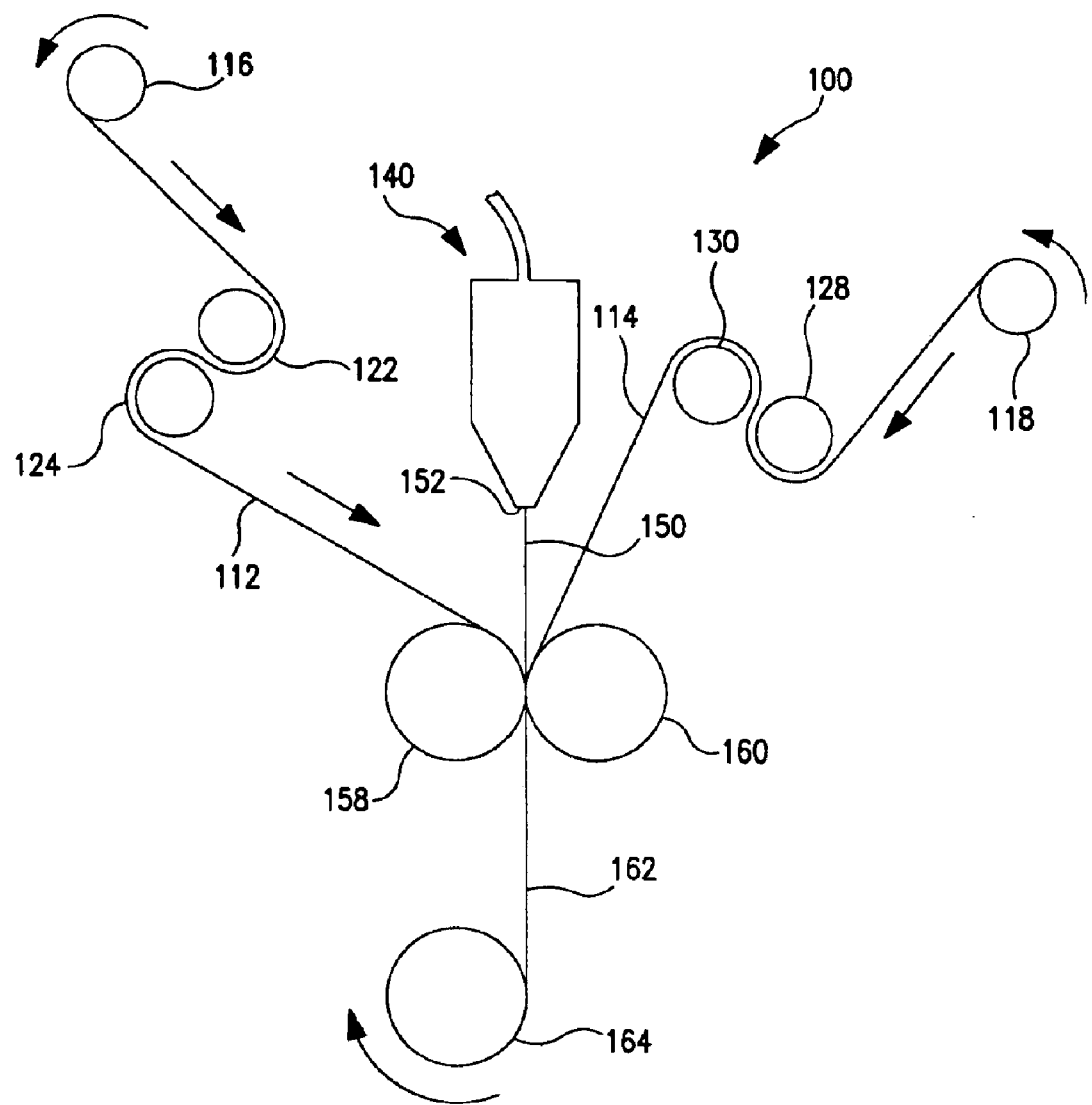
FIG. 2 schematically illustrates a process for making neck-bonded laminates including an elastic film and two outer nonwoven facing layers.

FIG. 1 schematically illustrates one form of a stretch-bonded laminate (SBL) process known as a vertical filament laminating (VFL) process. In a VFL process, designated as 10, an array of substantially parallel, nonintersecting elastic filaments is laminated between two nonwoven facing layers.

Referring to FIG. 1, an elastic polymer mixture is added via feeder 12 to an extrusion mixer 14, which melt blends the ingredients and feeds the blend through a feedblock 16 to a spin pump 18. The spin pump 18 forms the elastic polymer blend into individual filament streams which are fed through die 20 as an array 22 of substantially parallel continuous filaments using a suitable die temperature (for example, 450–500° F.) and a suitable die pressure (typically 300–4000 psi, suitably 1500–2500 psi). The elastic filaments in the filament array 22 are pulled around chill rolls 24 and 26, and are cooled. Chill rolls 24 and 26 may be plasma coated and chilled to a control temperature of about 45–60° F., typically about 50° F.

A first nonwoven facing layer 30, which can be a polypropylene spunbond layer, is unwound from a roll 32. A second nonwoven facing layer 34, which can be a polypropylene spunbond layer, is unwound from a roll 36. The nonwoven facing layers 30 and 34 are each sprayed with a melt spray adhesive using adhesive applicators 38 and 40. A suitable adhesive is Findley brand H2096, available from Ato-Findley Adhesives of Milwaukee, Wis. The adhesive may be applied at a basis weight of about 1–2 grams/m$^2$, using a spray die temperature of about 350–400° F.

The nonwoven facing layers 30 and 34 are combined with the elastic filament array 22 at a juncture between two counterrotating nip rolls 42 and 44. One of the nip rolls may be plasma coated, and the other may have a rubber surface. The nip rolls 42 and 44 may exert a bonding pressure of about 50–100 pounds per linear inch, suitably 70–90 pounds per linear inch.

The nip rollers 42 and 44 turn at surface speeds about 4 to 6 times as fast as the surface speeds of chill rolls 24 and 26, causing significant elongation of the elastic filament array 22 in the vicinity of the chill rolls, and in a stretching zone 23 located between the chill rolls and the nip rolls. The nip rolls 42 and 44 do not turn at surface speeds significantly faster than the unwind rolls 32 and 36, thus, there is little or no stretching of the nonwoven facings 30 and 34. Accordingly, when the filament array 22 is sandwiched between the nonwoven facing layers and bonded, the elastic filaments are substantially stretched and the nonwoven layers are substantially unstretched.

The resulting elastic laminate 46 is passed around S-rolls 48 and 50 and conveyed to storage or use. When the elastic laminate 46 is relaxed (untensioned), the elastic filament array 22 recovers, causing ruffles or gathers in the facing layers 30 and 34. The relaxed laminate 46 exhibits elastic stretching and recovery properties in the direction parallel to the lengths of the continuous filaments.

FIG. 2 schematically illustrates a neck-bonded laminate (NBL) process 100, in which an elastic film is extrusion laminated between two necked nonwoven webs. A first nonwoven facing 112, which can be a polypropylene spunbond web, is unwound from a supply roll 116 and passed around a first S-wrap roll assembly including rolls 122 and 124. A second nonwoven facing 114, which can be a polypropylene spunbond web, is unwound from a supply roll 118 and passed around a second S-wrap roll assembly including rolls 128 and 130. From the S-wrap roll assemblies, the nonwoven facing layers 112 and 114 are pulled toward a bonding assembly which includes counter-rotating nip rollers 158 and 160.

Nip rollers 158 and 160 turn at a surface speed which is about 1.05–1.5 times, suitably about 1.1–1.4 times the surface speeds of S-wrap rolls 122, 124, 128 and 130. This causes the nonwoven layers 112 and 114 to experience high tension in the machine direction (i.e., the direction of travel), causing the nonwoven layers to elongate in the machine direction and to neck in (narrow) in the cross direction (i.e., the direction orthogonal to the machine direction). The necking in may be aided by passing each of the nonwoven layers 112 and 114 through an oven or other suitable heating device (not shown) positioned between the S-rolls 124, 130 and the nip rolls 158, 160. The S-rolls and/or nip rolls may also be suitably heated. For polypropylene spunbond webs, suitable necking temperatures may range from about 220–280° F. Each nonwoven layer 112, 114 can be necked to about 25–80% of its initial width, suitably to about 30–70% of its initial width.

An elastic polymer mixture can be heated and blended in an apparatus 140 and extruded through a slot die 152 in the form of a molten elastic film 150. The molten elastic film 150 is extruded in between the necked nonwoven layers 112 and 114, and in between the nip rolls 158 and 160, to cause bonding between the film and the necked nonwoven layers. The resulting neck-bonded laminate 162 has elastic stretch and recovery properties in the cross-direction. Stretching of the laminate 162 in the cross direction causes the nonwoven layers 112 and 114 to become un-necked, and relaxation of the stretched laminate causes the nonwoven layers to become necked again. The neck-bonded laminate 162 can be wound and stored on roll 164, or it can be conveyed for further processing and use.

A variation of the NBL process is the neck-stretch bonded laminate (NSBL) process. In such a process, the elastic film 150 shown in FIG. 2 would be cooled and then stretched in the machine direction before being bonded to the necked nonwoven layers 112 and 114. A laminate formed by a NSBL process has elastic stretch and recovery properties in both the machine and cross directions. Furthermore, in the NSBL process, the elastic film 150 can be replaced with an elastic fibrous nonwoven web, an elastic foam, or an elastic laminate. The layers can be bonded together by adhesive or thermal bonding and pressure applied between the nip rolls 158 and 160.

The elastic laminate can be used in a variety of disposable articles, including without limitation garments, infection control products, and personal care products as defined above.

EXAMPLES 1–6

Vertical filament stretch-bonded laminates were made using a vertical filament laminating process as illustrated in FIG. 1. Each laminate included two 24-inch wide outer facing layers of polypropylene spunbond material. Each spunbond layer had a basis weight of 0.4 ounces per square yard ("osy"), a fiber denier of 2–3, a conventional wire weave interfilament bond pattern, and an interfilament bond area of 14.5–20.0% based on the total planar area of the spunbond layer. Each laminate also included an elastomeric central layer, present as a row of substantially parallel, nonintersecting elastomeric strands. The elastomeric strand layer had a width of at least 20 inches and a basis weight of about 10 grams per square meter (gsm). The elastomeric strands were extruded from a 20-inch wide die including 18 die openings per linear inch spaced evenly apart in three staggered rows, each opening having a diameter of 0.0275 inch. The layers were held together by 1.5 gsm Findley H2096 adhesive applied to each spunbond facing layer.

For Example 1 (comparative), the elastomeric strands were formed from a blend of 80% by weight KRATON 1730 styrene-(ethylene-propylene)-styrene-(ethylene-propylene) tetrablock copolymer from Kraton Polymers LLC, 7% by weight PETROTHANE NA601 polyethylene wax from Quantum Chemical Co., and 13% by weight REGALREZ 1126 tackifier from Eastman Chemical Co. The blend is also known as KRATON 6638. The laminate was produced by unwinding the spunbond layers from storage rolls and applying 1.5 gsm of the adhesive to the inner surface of each spunbond layer using spraying apparatus at a temperature of 390° F. The spraying apparatus was supplied by Illinois Tool Works, Dynatech Division of Henderson, Tenn. The elastomeric strands were stretched to 4.6 times their initial length (to a stretched basis weight of 10.5 gsm) and joined to the spunbond layers between opposing nip rollers having a surface speed of 300 ft/min. and a nip pressure of 150 pounds per linear inch. The resulting laminate was wound onto a storage roll and relaxed.

For Example 2 (comparative), the elastomeric strands were formed using the same polymer blend as in Example 1. The laminate was made using the same procedure, except that the elastomeric strands were stretched to 5.4 times their initial length (to a stretched basis weight of 9.5 gsm) prior to bonding.

For Example 3 (inventive), the elastomeric strands were formed from a blend of 75% by weight SEBSEB tetrablock copolymer, 7% by weight PETROTHANE NA601 polyethylene wax, 5% by weight crystal polystyrene resin, and 13% by weight REGALREZ 1126 tackifier. The polystyrene was NOVA 3600, available from Nova Chemicals Co. The laminate was produced using the same procedure described for Example 1 (the strands having a stretched basis weight of 10.5 gsm).

For Example 4 (inventive), the elastomeric strands were formed using the same polymer blend as in Example 3. The laminate was produced using the same procedure described for Example 1, except that the elastomeric strands were stretched to 5.4 times their initial length (to a stretched basis weight of 9.5 gsm) prior to bonding.

For Example 5 (inventive), the elastomeric strands were formed using the same polymer blend as in Examples 3 and 4, and the laminate was produced using the procedure described for Examples 1 and 3. The basis weight of the elastomeric strands was lowered by about 15% (yielding a stretched basis weight of 9.0 gsm).

The laminates of Examples 1–5 were tested for load at 50% elongation (grams), load at intercept (grans), percent elongation at intercept and percent elongation (stretch) to stop, using the following procedure. Each laminate was cut to produce samples having a 7-inch relaxed length (machine direction) and a 3-inch width (cross direction). Each sample was placed into the grips of a MTS Sintech 1/s frame, equipped with TESTWORKS software from MTS Sintech. Each sample was elongated at a rate of 20 inches per minute until a total force of 2000 grams was reached, at which point the stretching was stopped. The following values were generated. The reported data includes an average value for 10 samples from each laminate, and a standard deviation.

TABLE 1

TEST RESULTS

| Example No. | | Load @ 50% Stretch (grams) | Load @ Intercept (grams) | % Stretch At Intercept | % Stretch At Stop |
|---|---|---|---|---|---|
| 1 | Average | 404.1 | 777.0 | 202.1 | 227.1 |
|   | St. Dev. | 33.9 | 58.8 | 6.5 | 6.6 |
| 2 | Average | 388.4 | 800.6 | 221.1 | 249.1 |
|   | St. Dev. | 29.8 | 52.5 | 5.7 | 6.5 |
| 3 | Average | 461.1 | 918.2 | 181.2 | 204.9 |
|   | St. Dev. | 38.5 | 60.8 | 2.9 | 3.1 |
| 4 | Average | 485.0 | 1022.4 | 197.9 | 233.6 |
|   | St. Dev. | 41.8 | 67.8 | 3.3 | 4.4 |
| 5 | Average | 428.8 | 864.1 | 185.3 | 209.8 |
|   | St. Dev. | 43.4 | 65.8 | 5.9 | 7.0 |

As shown above, the inventive examples had higher load values for a given amount of stretch, and less stretch for a given load, than the closest comparative examples. This suggests that the inventive laminates can be made using a lower basis weight for the elastomeric strands, to achieve performance more similar to the prior laminates and a material cost savings.

Stress relaxation curves were generated for laminate materials made according to comparative Example 2, inventive Example 4, and inventive Example 6 (similar to Example 4 except that the elastomeric strands contained 68% by weight of the SEBSEB copolymer, 7% by weight of the polyethylene wax, 5% by weight of the crystal polystyrene and 20% by weight of the tackifier). To measure stress relaxation, each vertical filament stretch bonded laminate was cut to form 7-inch long by 3-inch wide samples as described above. Each sample was placed in the jaws of a MTS Sintech 10 G frame, equipped with Sintech TESTWORKS software, with an oven unit surrounding the sample and jaws. The oven was heated to 100° F. and the sample was allowed to equilibrate. The cross-head of the frame was displaced to pull the sample at 40 inches per minute to an elongation of 50%. The sample was held at 50% elongation and 100° F. for 12 hours. The Sintech software recorded load loss as a function of time during the 12-hour period. The slope of a log-log plot of load versus time was calculated for the 12-hour period at 50% elongation. The load loss at 12 hours was divided by the initial load, and the result multiplied by 100 to determine the percent load loss for the 12-hour period.

The stress relaxation curves for the three examples are plotted in FIG. 3. As shown in FIG. 3, the two inventive laminates had more stress relaxation at all times during the 12-hour period, than the comparative laminate. The total % load loss and average slope for the three samples were determined to be as follows:

|  | % Load Loss | Slope |
|---|---|---|
| Comparative Example 2 | 43 | −0.07 |
| Inventive Example 4 | 48 | −0.08 |
| Inventive Example 6 | 46 | −0.06 |

EXAMPLES 7–10

Polymer film samples were made using various polymer blends useful in forming the elastic layer for the laminates of the invention. To make each film sample, the ingredients were fed to a Brabender plasticorder equipped with a 0.75-inch diameter screw with a compression ratio of 5:1 and a length to diameter ratio of 32:1. The screw was a straight metering screw. The Brabender was equipped with three heating zones along the screw, and a heated film extrusion die having a slot length (corresponding to film width) of 10 inches. The temperatures were adjusted to produce a melt temperature of about 210–220° C. The ingredients were blended, and the film cast, using a screw speed of 20 rpm and a die pressure of 500–1000 psi. Each extruded film was passed to a chill roll after exiting the die, and to a windup roll. The roll speeds were adjusted to obtain film having a thickness of 10 mils.

For Example 7 (comparative), the film had the same polymer composition as the strands in Examples 1 and 2, namely 80% by weight KRATON 1730 styrene-(ethylene-propylene)-styrene-(ethylene-propylene) tetrablock copolymer, 7% by weight PETROTHANE NA601 polyethylene wax, and 13% by weight REGALREZ 1126 tackifier.

For Example 8 (inventive), the film had the same polymer composition as the strands in Examples 3–5, namely 75% by weight SEBSEB tetrablock copolymer, 7% by weight PETROTHANE NA601 polyethylene wax, 5% by weight NOVA 3600 crystal polystyrene resin, and 13% by weight REGALREZ 1126 tackifier. The SEBSEB copolymer had a melt flow rate of 8.2 grams/10 min. measured using ASTM D1238, at 230° C. and a load of 5 kg.

For Example 9 (inventive) the film had the same polymer composition as Example 8, except that the melt flow rate of the SEBSEB copolymer was 6.0 grams/10 min. instead of 8.2 grams/10 min.

For Example 10 (inventive), the film had the same polymer composition as the strands in Example 6, namely 68% by weight SEBSEB tetrablock copolymer (melt flow rate of 8.2 grams/10 min.), 7% by weight PETROTHANE NA601 polyethylene wax, 5% by weight NOVA 3600 crystal polystyrene, and 20% by weight REGALREZ 1126 tackifier.

The film samples of Examples 7–10 were tested for various mechanical properties at room temperature using a Sintech 1/S Materials Testing Systems Frame. Film samples having a thickness of 10 mils were cut into a dog bone shape with a center width of 0.5 inch and end widths of 1.0 inch. Each film sample was held between two sets of jaws, initially spaced one inch apart, with the wider end portions completely inside the jaws. The jaws were pulled at a cross-head displacement rate of 20 inches per minute, to stretch the film sample until failure.

The measured load was normalized with respect to the exposed cross-sectional area of the film sample to obtain stress data. The elongation was calculated based on the change in length of the exposed sample. The modulus, which is a measure of the rigidity of the sample, was calculated from the stress and elongation data by applying the rubber elasticity theory. The mechanical properties measured for Examples 7–10 are reported in Table 2.

TABLE 2

Mechanical Properties

| Example | Shear Modulus, G (psi) | Young's Elastic Modulus, E (psi) | Stress at 50% (psi) | % Increase in Stress | Elongation at Break | Stress at Break | Elongation at Yield | Stress at Yield |
|---|---|---|---|---|---|---|---|---|
| 7 | 200 | 600 | 170 |  | 560% | 970 | 10% | 70 |
| 8 | 270 | 800 | 200 | 18 | 630% | 2740 | 11% | 80 |
| 9 | 300 | 880 | 220 | 29 | 640% | 2900 | 11% | 90 |
| 10 | 220 | 660 | 180 | 6 | 700% | 1450 | 11% | 70 |

As shown in Table 2, the polymer composition useful in the elastic layer of the laminates of the invention, made using a SEBSEB tetrablock copolymer, has significantly improved properties compared to control polymer composition made using a styrene-(ethylene-propylene)-styrene-(ethylene-propylene)-tetrablock copolymer. These improved properties may include:

a) an elastic modulus at least 10% higher, suitably at least 25% higher;
b) a stress at 50% elongation at least 5% higher, suitably at least 15% higher;
c) an elongation at break at least 10% higher; and
d) a stress at break at least 40% higher, suitably at least 100% higher.

While the embodiments of the invention disclosed herein are presently preferred, various modifications and improvements can be made without departing from the spirit and scope of the invention. The scope of the invention is indicated by the appended claims, and all changes that fall within the meaning and range of equivalents are intended to be embraced therein.

What is claimed is:

1. An elastic laminate, comprising:
   an elastic layer including about 25–100% by weight of a SEBSEB copolymer; and
   at least one facing layer comprising a fibrous thermoplastic nonwoven web, bonded to the elastic layer;
   the SEBSEB copolymer having a number average molecular weight of at least about 70,000 and including a styrene end block, an ethylene-butylene midblock, a styrene midblock, and an ethylene-butylene end block;
   the ethylene-butylene blocks having number average molecular weights which together constitute more than 75% of the number average molecular weight for the SEBSEB copolymer;
   the styrene midblock having a number average molecular weight about 5–50% higher than a number average molecular weight of the styrene end block.

2. The elastic laminate of claim 1, comprising a stretch-bonded laminate.

3. The elastic laminate of claim 2, comprising a vertical filament laminate.

4. The elastic laminate of claim 1, comprising a neck-bonded laminate.

5. The elastic laminate of claim 4, comprising a neck-stretch bonded laminate.

6. The elastic laminate of claim 1, comprising two of the facing layers bonded on both sides of the elastic layer.

7. The elastic laminate of claim 1, wherein the elastic layer comprises an array of substantially parallel, nonintersecting filaments.

8. The elastic laminate of claim 1, wherein the elastic layer comprises a film.

9. The elastic laminate of claim 1, wherein the elastic layer comprises a foam.

10. The elastic laminate of claim 1, wherein the elastic layer comprises a fibrous nonwoven web.

11. The elastic laminate of claim 1, wherein the elastic layer comprises a net.

12. The elastic laminate of claim 1, wherein the SEBSEB copolymer has a number average molecular weight of about 73,000 to about 100,000.

13. The elastic laminate of claim 1, wherein the elastic layer further comprises a poly(monoalkenyl arene).

14. The elastic laminate of claim 13, wherein the elastic layer further comprises a polyolefin.

15. The elastic laminate of claim 14, wherein the elastic layer further comprises a tackifying resin.

16. An elastic laminate, comprising:
   an elastic layer including about 50–80% by weight of a SEBSEB copolymer, about 4–15% by weight of a poly(monoalkenyl arene), about 5–20% by weight of a polyolefin, and zero to about 25% by weight of a tackifying resin; and
   at least one fibrous thermoplastic nonwoven facing layer bonded to the elastic layers;
   the SEBSEB copolymer having a number average molecular weight of at least about 70,000 and including a styrene end block, an ethylene-butylene midblock, a styrene midblock, and an ethylene-butylene end block;
   the styrene midblock having a number average molecular weight about 5–50% higher than a number average molecular weight of the styrene end block.

17. The elastic laminate of claim 16, comprising two of the facing layers bonded on both sides of the elastic layer.

18. The elastic laminate of claim 16, wherein the elastic layer includes about 65–75% by weight of the SEBSEB copolymer, about 5–10% by weight of the poly(monoalkenyl arene), about 5–15% by weight of the polyolefin, and about 10–25% by weight of the tackifying resin.

19. The elastic laminate of claim 16, wherein the SEBSEB copolymer has a number average molecular weight of about 70,000 to about 120,000.

20. The elastic laminate of claim 16, wherein the poly(monoalkenyl arene) comprises polystyrene.

21. The elastic laminate of claim 16, wherein the polyolefin comprises a polyethylene wax.

22. The elastic laminate of claim 16, wherein the tackifying resin comprises a hydrocarbon resin selected from low molecular weight hydrogenated polystyrene, low molecular weight hydrogenated poly-alphamethyl styrene, and combinations thereof.

23. The elastic laminate of claim 16, wherein the facing layer comprises a fibrous nonwoven web.

24. The elastic laminate of claim 16, wherein the elastic layer comprises an array of substantially parallel, nonintersecting filaments.

25. The elastic laminate of claim 16, wherein the elastic layer comprises a film.

26. The elastic laminate of claim 16, wherein the elastic layer comprises a foam.

27. The elastic laminate of claim 16, wherein the elastic layer comprises a net.

28. The elastic laminate of claim 16, wherein the elastic layer comprises a fibrous nonwoven web.

29. A disposable garment comprising the elastic laminate of claim 16.

30. A disposable infection control product comprising the elastic laminate of claim 16.

31. A disposable personal care product comprising the elastic laminate of claim 16.

32. An elastic laminate, comprising:
  an elastic layer including about 25–100% by weight of a SEBSEB copolymer, zero to about 25% by weight of a poly(monoalkenyl arene), zero to about 25% by weight of a polyolefin, and zero to about 25% by weight of a tackifying resin; and
  two nonwoven facing layers bonded to the elastic layer;
  the SEBSEB copolymer having a number average molecular weight of at least about 70,000 and including a styrene end block, an ethylene-butylene midblock, a styrene midblock, and an ethylene-butylene end block, each of the blocks having a number average molecular weight;
  the number average molecular weight of the styrene midblock being at least about 5% higher than the number average molecular weight of the styrene end block.

33. The elastic laminate of claim 32, wherein the number average molecular weight of the styrene midblock is about 10–50% higher than the number average molecular weight of the styrene end block.

34. The elastic laminate of claim 32, wherein the number average molecular weight of the styrene midblock is about 15–35% higher than the number average molecular weight of the styrene end block.

35. The elastic laminate of claim 32, wherein:
  the styrene end block has a number average molecular weight of about 6,000 to about 8,000;
  the styrene midblock has a number average molecular weight of about 7,500 to about 9,000;
  the ethylene-butylene midblock has a number average molecular weight of about 55,000 to about 70,000; and
  the ethylene-butylene end block has a number average molecular weight of about 5,000 to about 12,000.

36. The elastic laminate of claim 32, wherein the elastic layer includes about 50–80% by weight of the SEBSEB copolymer.

37. The elastic laminate of claim 32, wherein the elastic layer includes about 4–15% by weight of the poly (monoalkenyl arene).

38. The elastic laminate of claim 32, wherein the elastic layer includes about 5–20% by weight of the polyolefin.

39. The elastic laminate of claim 32, wherein the elastic layer includes about 10–25% by weight of the tackifying resin.

40. A disposable garment comprising the elastic laminate of claim 32.

41. A disposable infection control product comprising the elastic laminate of claim 32.

42. A disposable personal care product comprising the elastic laminate of claim 32.

43. The elastic laminate of claim 32, wherein the nonwoven facing layers comprise spunbond webs.

44. The elastic laminate of claim 32, wherein the elastic layer comprises an array of substantially continuous, non-intersecting filaments.

45. The elastic laminate of claim 44, comprising a stretch-bonded laminate.

46. The elastic laminate of claim 32, wherein the elastic layer comprises a material selected from a film, foam, fibrous nonwoven web, and combinations thereof.

47. The elastic laminate of claim 46, comprising a neck-bonded laminate.

48. The elastic laminate of claim 46, comprising a stretch-bonded laminate.

49. The elastic laminate of claim 46, comprising a neck-stretch bonded laminate.

50. An elastic laminate, comprising:
  an elastic layer including about 25–100% by weight of a SEBSEB tetrablock copolymer; and
  at least one fibrous thermoplastic nonwoven facing layer bonded to the elastic layer;
  wherein the elastic layer is formed of an elastic polymer composition having an elastic modulus at least 10% higher than for a control polymer composition including 80% by weight styrene-(ethylene-propylene)-styrene-(ethylene-propylene) tetrablock copolymer, 7% by weight polyethylene wax, and 13% by weight tackifying resin;
  the SEBSEB copolymer having a number average molecular weight of at least about 70,000 and including a styrene end block, an ethylene-butylene midblock, a styrene midblock, and an ethylene-butylene end block;
  the styrene midblock having a number average molecular weight about 5–50% higher than a number average molecular weight of the styrene end block.

51. The elastic laminate of claim 50, wherein the elastic modulus for the elastic polymer composition is at least 25% higher than for the control polymer composition.

52. An elastic laminate, comprising:
  an elastic layer including about 25–100% by weight of a SEBSEB tetrablock copolymer; and
  at least one fibrous thermoplastic nonwoven facing layer bonded to the elastic layer;
  wherein the elastic layer is formed of an elastic polymer composition having a stress at 50% elongation at least 5% higher than for a control polymer composition including 80% by weight styrene-(ethylene-propylene)-styrene-(ethylene-propylene) tetrablock copolymer, 7% by weight polyethylene wax, and 13% by weight tackifying resin;
  the SEBSEB copolymer having a number average molecular weight of at least about 70,000 and including a styrene end block, an ethylene-butylene midblock, a styrene midblock, and an ethylene-butylene end block;
  the styrene midblock having a number average molecular weight about 5–50% higher than a number average molecular weight of the styrene end block.

53. The elastic laminate of claim 52, wherein the stress at 50% elongation for the elastic polymer composition is at least 15% higher than for the control polymer composition.

54. An elastic laminate, comprising:
  an elastic layer including about 25–100% by weight of a SEBSEB tetrablock copolymer; and
  at least one fibrous thermoplastic nonwoven facing layer bonded to the elastic layer;

wherein the elastic layer is formed of an elastic polymer composition having an elongation at break at least 10% higher than for a control polymer composition including 80% by weight styrene-(ethylene-propylene)-styrene-(ethylene-propylene) tetrablock copolymer, 7% by weight polyethylene wax, and 13% by weight tackifying resin;

the SEBSEB copolymer having a number average molecular weight of at least about 70,000 and including a styrene end block, an ethylene-butylene midblock, a styrene midblock, and an ethylene-butylene end block; the styrene midblock having a number average molecular weight about 5–50% higher than a number average molecular weight of the styrene end block.

55. The elastic laminate of claim 54, wherein the elastic polymer composition has a stress at break at least 40% higher than for the control polymer composition.

56. The elastic laminate of claim 55, wherein the stress at break for the elastic polymer composition is at least 100% higher than for the control polymer composition.

* * * * *